United States Patent [19]

Jarvis et al.

[11] Patent Number: 4,659,199

[45] Date of Patent: Apr. 21, 1987

[54] APPARATUS FOR USE IN CODING SPLICED FILM

[76] Inventors: Richard J. Jarvis, 17 Barrett St., South Burlington, Vt. 05401; Stephen A. Jarvis, 64 Severance Rd., Colchester, Vt. 05446

[21] Appl. No.: 802,586

[22] Filed: Nov. 26, 1985

[51] Int. Cl.[4] .............................................. G03B 21/50

[52] U.S. Cl. ...................................... 352/92; 352/236; 352/130; 352/224; 352/129

[58] Field of Search ................. 352/92, 236, 129, 130, 352/224

[56] References Cited

U.S. PATENT DOCUMENTS 2,905,048 9/1959 Miller .................................. 352/92

2,906,167 9/1959 Castedello et al. ................. 352/129

3,148,573 9/1964 Bender ............................... 352/130

*Primary Examiner*—Monroe H. Hayes

*Attorney, Agent, or Firm*—Harvey B. Jacobson

[57] ABSTRACT

Apparatus for marking the edge of a film particularly for identifying head and tail sections of film strips joined by a splice comprising a holder with a channel-like film guide in which the film may be inserted for longitudinal movement and a hole for a pen-type applicator positioned so that as the film is moved lengthwise through the guide one edge of the film is wiped across the tip of the applicator so that a continuous ink or dye mark is applied to the film edge which appears as a ring on the side of the film when it is wound onto a reel.

7 Claims, 3 Drawing Figures

APPARATUS FOR USE IN CODING SPLICED FILM

BACKGROUND OF THE INVENTION

This invention relates to an apparatus for use in marking motion picture films and the like more particularly for identifying the location of a splice.

The apparatus is primarily though not exclusively intended for use by projectionists in motion picture theatres as an aid to identifying head and tail sections of release prints as they are spliced together for projection. Release prints typically are provided on 20 minute reels and are spliced together and wound on a single reel for projection. While modern theatres may employ state of the art projection equipment, projectionists often are found to use tedious, messy and generally unsatisfactory techniques for identifying splices in a continuous reel of film, such techniques including for example the use of white-out, shoe polish, tape or equally inefficient means. The cutting, punching and notching of film and the use of opaque pigments applied to the planar surface of the film are also known for various marking purposes. The present invention fulfills the need for an effective and easy method film marking.

SUMMARY OF THE INVENTION

The invention provides apparatus for effectively applying a readily identifiable marking ink or dye confined to the edge surface of a film, for example to identify head and tail sections of adjacent film strips joined by a splice. To this end, the apparatus preferably includes a holder formed with a channel-like film guide into which a film may be inserted and moved longitudinally, the guide including upper and lower slots for embracing opposite longitudinal edge portions of the film, and the holder including an applicator hole opening into the base of one of the slots for receiving a pen-type applicator and restrictively applying a continuous longitudinal mark of ink, dye, or the like to one longitudinal edge of the film as the film is moved through the guide as aforesaid.

In use, a film may be inserted into the guide by laterally flexing the film, a pen-type applicator storing a making medium such as a suitably colored ink or dye, for example silver ink, is inserted in the applicator opening, and the film moved longitudinally through the guide so as to wipe one edge thereof across the applicator tip, for example at head and tail portions of adjacent film strips joined by a splice. After marking, the applicator is preferably removed from the holder prior to removal of the film to avoid damage to the applicator tip. When the film is wound onto a reel, the marked length will appear as a highly visible ring on one side of the reel which does not substantially affect the sound track or the projection of light through the film.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

The film marking apparatus in accordance with the invention includes a holder 10 mounted on a base 12 by any suitable means, not shown. The base should preferably be sufficiently heavy to stabilize the holder on a table or other work top, and may have pads, not shown, on the bottom. The holder may be formed in a suitable material such as a hard plastic.

Figure 1:
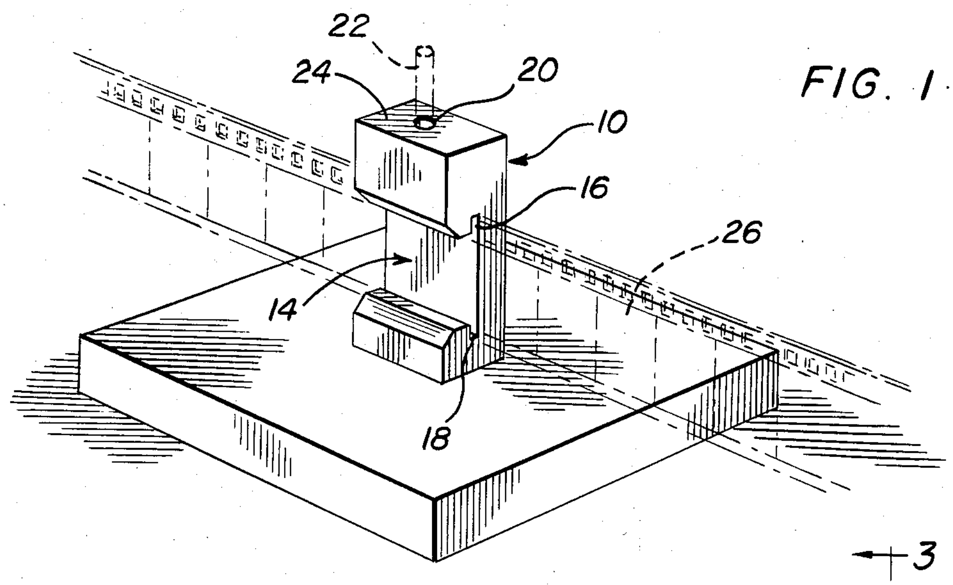
FIG. 1 is a perspective view of a film marking apparatus in accordance with the invention.
Figure 2:
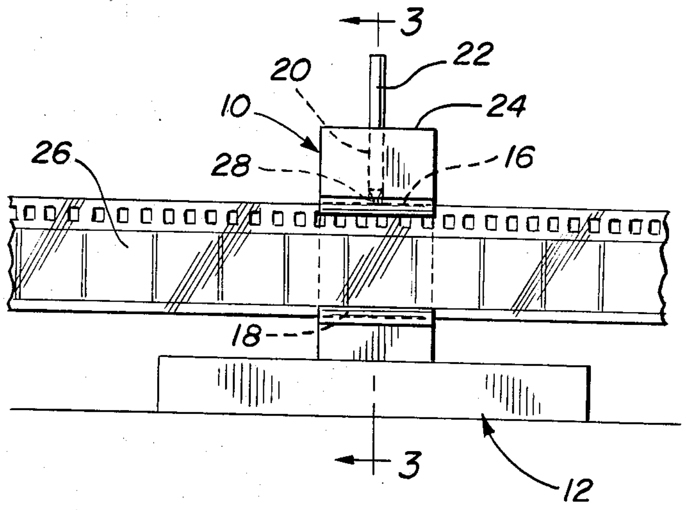
FIG. 2 is a front elevational view of the apparatus in combination with a film being marked and a pen-type applicator.
Figure 3:
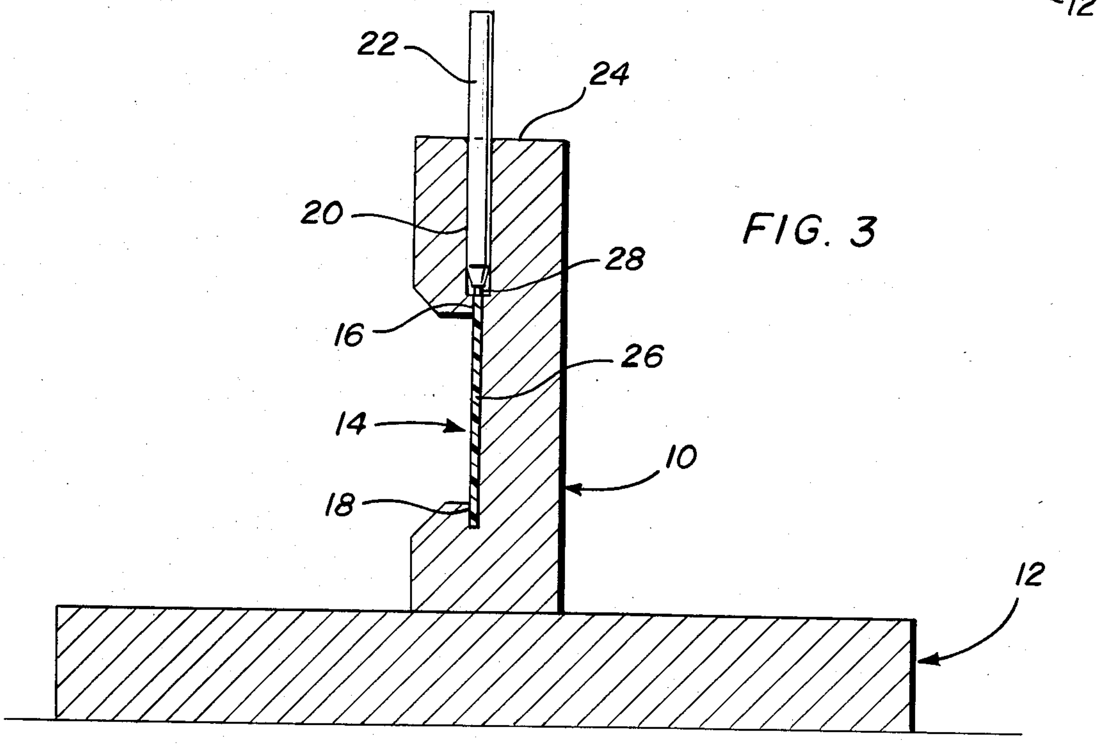
FIG. 3 is an enlarged sectional view on line 3—3 of FIG. 2.

The holder 10 is formed along its front face with a channel-like film guide 14 having upper and lower rebated slots 16, 18 for embracing the opposite longitudinal edges and marginal edge portions of a standard-width film as shown, it being understood that the height of the guide between the bases of the respective slots is related to the width of the film so as to receive the film and permit it to be readily moved longitudinally in the slot with the appropriate degree of clearance relative to the marginal edge portions of the film parallel to its plane of movement. An applicator hole 20 for a pen-type applicator 22 extends from top surface 24 of the holder in alignment with the plane of film movement and opens into the base surface of the upper slot 16 through which the upper edge surface of the film is restrictively exposed as shown in FIG. 3.

In use, a spliced film 26 to be marked is positioned in the guide 14 in the region of the splice, by laterally flexing the film into the slots 16, 18. Applicator 22, which may have a felt or like marking tip 28 is positioned in the hole 20 so that the tip rests on the upper edge surface of the film. Then, the film is moved longitudinally along the guide to wipe its upper edge across the tip of the pen so that an ink or dye mark is applied to head and tail sections on opposite sides of the splice to a required length. In this manner, a vivid regular and effective ink mark is restrictively applied to the edge of the film without affecting the sound track by coating of the film surfaces along the marginal edge portions. After marking, the applicator should preferably be removed before the film to avoid damage to the applicator tip. Known felt-tip, pen-type ink and dye applicators are suitable for use in the holder. The apparatus provides the film with a mark which, when the film is wound onto a reel appears as a vivid ring on one side of the reel thereby readily identifying the location of a splice.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for marking motion picture film and the like, for example for identifying splice locations, the apparatus comprising a holder formed with a channel-like film guide into which a film may be inserted and moved longitudinally through the guide, the guide including upper and lower slots receiving opposite longitudinal edges and marginal portions of the film, and the holder having an applicator hole opening into one of the slots and applicator means inserted into said hole for applying a continuous longitudinal mark confined to one of the longitudinal edges of the film as the film moves through the guide.

2. The invention of claim 1 wherein the holder is mounted on a stabilizing base, the guide extends laterally across a front face of the holder, the slots are defined in upper and lower rebate portions of the guide, and the applicator hole extends from an upper surface of the holder into a base wall of the upper slot.

3. The invention of claim 2 wherein the applicator means inserted in the applicator hole is a pen-type marker having a tip to engage said one of the edges of the film.

4. Apparatus for marking a film by application thereto of a marking medium, comprising a holder having a film backing face on which the film is slidably displaced along a plane of movement and guide means mounted on the holder for limiting said slidable displacement of the film to a fixed path in said plane of movement, said film having parallel spaced edge surfaces perpendicular to the plane of movement in slide bearing relation to the guide means during said displacement of the film and marginal edge portions parallel to the plane of movement between which the edge surfaces extend, the improvement comprising means mounted by the holder in alignment with the plane of movement for directing said application of the marking medium onto at least one of the edge surfaces of the film during said displacement thereof and channel forming means mounted by the guide means in enclosing relation to the marginal edge portions of the film passing therethrough for confining said application of the marking medium to said one of the edge surfaces of the film.

5. The apparatus of claim 4 wherein said marking medium is ink wiped onto said one of the edge surfaces from a pen-type applicator.

6. The improvement as defined in claim 5 wherein said application directing means is established by an applicator hole formed in the holder through which said one of the edge surfaces is restrictively exposed to the marking medium.

7. The improvement as defined in claim 4 wherein said application directing means is established by an applicator hole formed in the holder through which said one of the edge surfaces is restrictively exposed to the marking medium.

* * * * *